(12) United States Patent
Suzuki et al.

(10) Patent No.: US 6,584,852 B2
(45) Date of Patent: Jul. 1, 2003

(54) ELECTRICAL CAPACITANCE PRESSURE SENSOR HAVING ELECTRODE WITH FIXED AREA AND MANUFACTURING METHOD THEREOF

(75) Inventors: Yasutoshi Suzuki, Okazaki (JP);
Seiichiro Ishio, Kariya (JP); Tetsuo Fujii, Toyohashi (JP); Keiichi Shimaoka, Aichi-gun (JP); Hirofumi Funahashi, Aichi-gun (JP)

(73) Assignee: Denso Corportation, Kariya (JP)

( * ) Notice: Subject to any disclaimer, the term of this patent is extended or adjusted under 35 U.S.C. 154(b) by 0 days.

(21) Appl. No.: 10/176,590

(22) Filed: Jun. 24, 2002

(65) Prior Publication Data

US 2003/0005774 A1 Jan. 9, 2003

(30) Foreign Application Priority Data

Jul. 6, 2001 (JP) ........................ 2001-206688

(51) Int. Cl.[7] ................................. G01L 9/12
(52) U.S. Cl. ...................................... 73/718
(58) Field of Search .................. 73/718, 724, 754; 361/283.1, 283.2, 283.3, 283.4

(56) References Cited

U.S. PATENT DOCUMENTS

| 4,838,088 | A | 6/1989 | Murakami | 73/724 |
| 5,679,902 | A | 10/1997 | Ryhänen | 73/718 |

FOREIGN PATENT DOCUMENTS

| JP | A-11-258089 | 9/1999 |
| JP | A-2000-214035 | 8/2000 |

*Primary Examiner*—William Oen
(74) *Attorney, Agent, or Firm*—Posz & Bethards, PLC (57) ABSTRACT

An electrical capacitance pressure sensor has a lower electrode, a movable electrode, and an upper electrode. A first cavity portion is formed between the lower electrode and the movable electrode. A second cavity portion is formed between the upper electrode and the movable electrode. The substrate has an opening portion that penetrates the substrate from the first surface to the second surface thereof. The lower electrode has at least one first window portion that penetrates the lower electrode from the side of the substrate to the side of the first cavity portion and communicates the cavity portion to the opening portion of the substrate. The upper electrode has at least one second window portion that penetrates the upper electrode from the side of the cavity portion to the outside thereof to communicate the cavity portion with the outside.

22 Claims, 9 Drawing Sheets

ELECTRICAL CAPACITANCE PRESSURE SENSOR HAVING ELECTRODE WITH FIXED AREA AND MANUFACTURING METHOD THEREOF

FIELD OF THE INVENTION

The present invention relates to pressure sensors, and specifically to an electric capacitance pressure sensor and manufacturing method thereof.

DESCRIPTION OF THE RELATED

Figure 15:
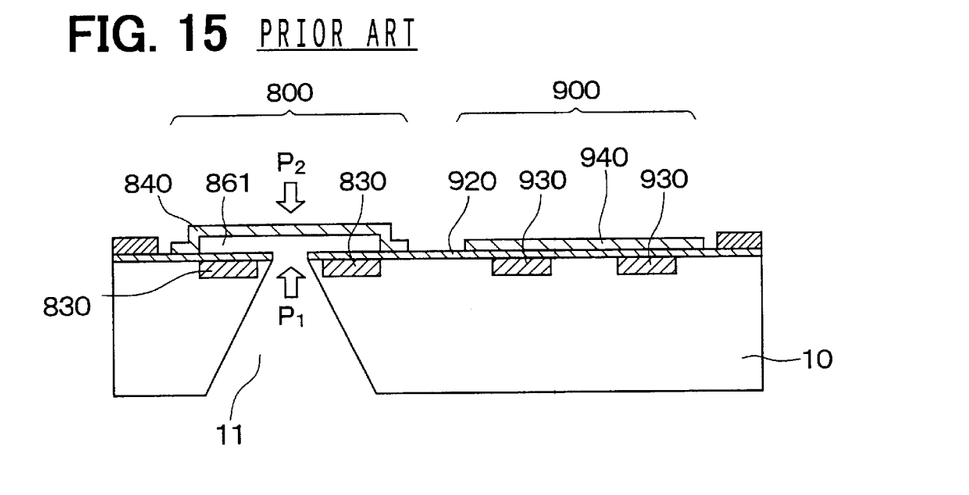
FIG. 15 is a cross sectional view showing a prior art electrical capacitance pressure sensor.

JP-A-2000-214035 discloses a conventional electric capacitance pressure sensor, a cross sectional view of which is shown in FIG. 15. The pressure sensor includes a substrate 10, a capacitance change portion 800 that changes a capacitance value thereof based on an applied pressure, and a reference portion 900 that minimally changes capacitance value thereof.

The capacitance change portion 800 has a first lower electrode 830 formed on a side of the substrate 10, a first movable electrode (first upper electrode) 840 that forms a diaphragm, a cavity portion 861 formed between the first lower electrode 830 and the first movable electrode 840, and an opening portion 11. The first movable electrode 840 is formed on the substrate 10 so as to be separated from the first lower electrode 830. The cavity portion 861 is formed by etching a sacrificial layer that is formed between the first lower electrode 830 and the first movable electrode 840. The opening portion 11 is formed by etching the substrate 10 from the other side thereof and communicates with the cavity portion 861.

The reference portion 900 also has a second lower electrode 930 formed on the surface of the substrate 10, and a second upper electrode 940 formed on the second lower electrode 930 through an isolation layer 920 to face the second lower layer 930.

In the pressure sensor, the movable electrode 840 deforms based on a pressure difference (P1–P2) between a pressure P1 applied to the movable electrode 840 on the side of the cavity portion 861 and a pressure P2 applied to the movable electrode 840 on the side of an opposite side thereof. Therefore, a change in electrical is capacitance formed by the lower electrode 830 and the movable electrode 840 is detected based on a difference between outputs of the capacitance change portion 800 and the reference portion 900.

In the pressure sensor shown in FIG. 15, the cavity portion 861 is formed by etching the sacrificial layer by pouring etching liquid through the opening portion 11, after forming the opening portion 11 by etching the substrate 10 and the lower electrode 830 formed in the substrate 10. Therefore, a surface of the lower electrode 830 on which the etching liquid is poured is removed. Accordingly, an area of the lower electrode 830 decreases and the electrical capacitance also decreases. As a result, the sensitivity of the pressure sensor decreases.

Figure 16:
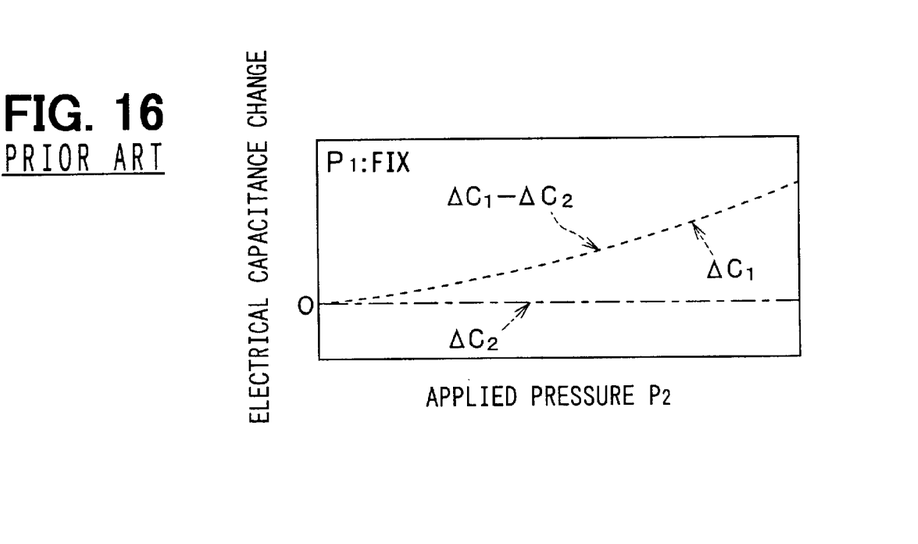
FIG. 16 is a graph showing a prior art relationship between pressure applied to the electrical capacitance pressure sensor and a change in electrical capacitance.

Further, the output characteristics of the pressure sensor are shown in FIG. 16. FIG. 16 shows the capacitance value change ΔC1 of the capacitance change portion 800 and the capacitance value change ΔC2 of the reference portion 900 when the pressure P1 is fixed and the pressure P2 is increased. As shown in FIG. 16, the capacitance value ΔC2 is fixed even if the pressure P1 is changed, while the capacitance value ΔC1 is changed when the pressure C1 is changed because the gap between the movable electrode 840 and the first lower electrode 830 decreases.

However, characteristics of an output difference (ΔC1–ΔC2) between the capacitance value ΔC1 and the capacitance value ΔC2 to the applied pressure P1, P2 produce concave graphical results because deformation characteristics of the movable electrode 840 relative to the applied pressure P1, P2 are nonlinear. Accordingly, accuracy of the pressure sensor decreases.

SUMMARY OF THE INVENTION

It is therefore an object of the present invention to provide an electrical pressure sensor and manufacturing method thereof that is capable of obviating the above problem.

It is another object of the present invention to provide an electrical pressure sensor manufacturing method that is capable of minimizing decreases in sensitivity of the sensor.

It is another object of the present invention to provide an electrical pressure sensor that is capable of obtaining high accuracy.

In an electrical capacitance pressure sensor of the present invention, a lower electrode is formed on a first surface of a substrate. The substrate has an opening portion that penetrates the substrate from the first surface to the second surface. Also, the lower electrode has at least one window portion that penetrates the lower electrode from the side of the substrate to the side of a cavity portion and communicates the cavity portion with the opening portion of the substrate.

According to the pressure sensor of the present invention, the at least one window portion can be formed in the lower electrode through the opening portion of the substrate. Therefore, a sacrificial layer formed between the lower electrode and a movable electrode is removed through the at least one window portion and the opening portion. In this case, because it is unnecessary to remove a part of the lower electrode, a decrease in the electrode area is minimized. Accordingly, it is possible to provide an electrical capacitance pressure sensor that is capable of controlling the decrease in sensitivity thereof.

The pressure sensor alternatively has a cover member formed on the lower electrode on the side of the opening portion of the substrate. The cover member covers the at least one window portion to separate the cavity portion from an outside thereof and to form a reference pressure chamber by the cavity portion.

Accordingly, the cavity portion is separated from an outside of the pressure sensor and forms a reference pressure chamber. Therefore, an absolute pressure sensor can be constructed.

In this case, the at least one window portion is preferably formed diagonally with respect to a perpendicular direction of the lower electrode. At least one large diameter member having a diameter larger than that of the window portion can alternatively cover the window portion. For example, the at least one large diameter member may be a ball member or a circular cylinder member.

Also, in an electrical capacitance pressure sensor of the present invention, an upper electrode is formed on the movable electrode and is separated by a predetermined distance from the movable electrode. A second cavity portion is formed between the upper electrode and the movable electrode to form a second electrical capacitance that is to be changed to a second capacitance value thereof when the movable electrode deforms based on a pressure difference between both sides thereof. The upper electrode has at least one second window portion that penetrates the upper electrode from the side of the second cavity portion to the outside thereof to communicate the second cavity portion to the outside.

The pressure sensor detects relative pressure between pressures of the first cavity portion and the second cavity portion. The at least one second window portion is formed in the upper electrode as well as at least one first window portion in the lower electrode. Therefore, a second sacrificial layer formed between the movable electrode and the upper electrode is removed through the at least one second window portion. Accordingly, it is possible to provide an electrical capacitance pressure sensor that is capable of minimizing a decrease in sensitivity thereof. The output characteristics of the pressure sensor have good linearity.

BRIEF DESCRIPTION OF THE DRAWINGS

Other objects, features and advantages of the present invention will be understood more fully from the following detailed description made with reference to the accompanying drawings in which.

DETAILED DESCRIPTION OF THE PREFERRED EMBODIMENT

The present invention will be described further with reference to various embodiments shown in the drawings.
(First Embodiment)

Figure 1:
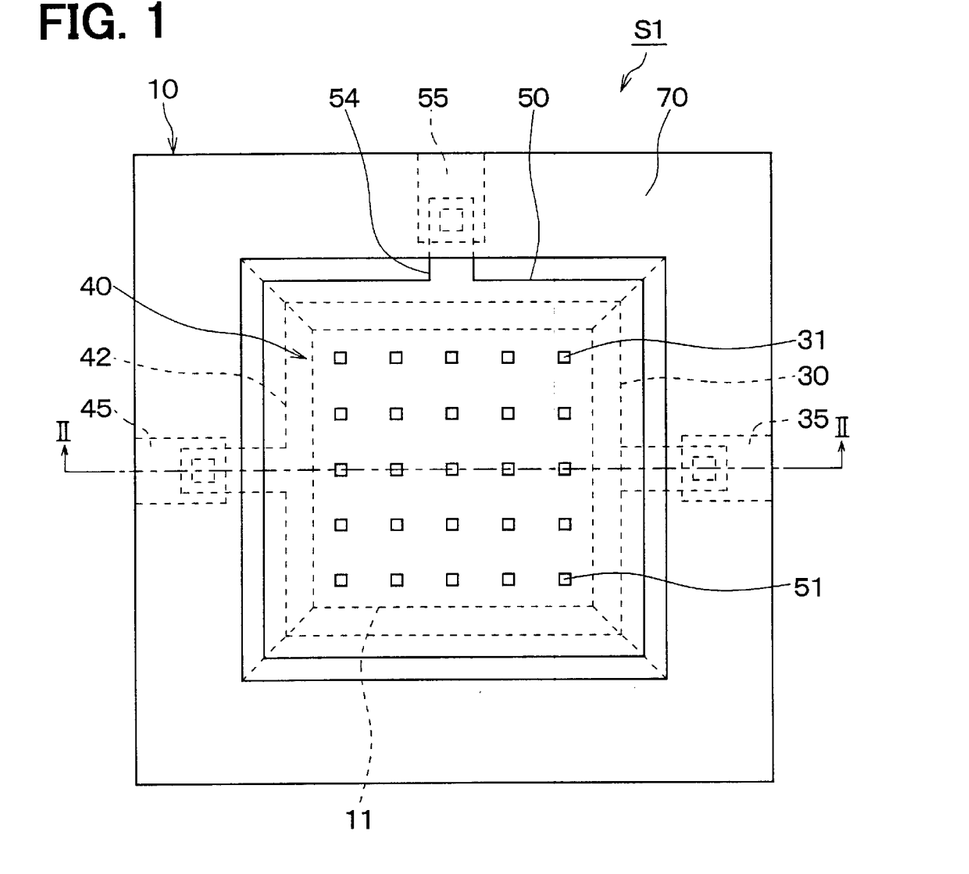
FIG. 1 is a front view showing an electrical capacitance pressure sensor according to a first embodiment of the present invention.

Referring to FIGS. 1A–1C, an electrical capacitance pressure sensor (pressure sensor) S1 is manufactured on a substrate 10. The substrate 10 is, for example, a semiconductor substrate such as poly-Si (silicon) and has a first surface and a second surface. Many kind of layers, electrodes and the like are formed on the first surface. An opening portion 11 is formed in the substrate 10 so as to penetrate from the second surface to the first surface in a direction perpendicular to the substrate 10. The opening portion 11 is rectangularly shaped on the second surface shown as indicated by the referenced broken line in FIG. 1 and is used for a pressure introducing path.

Figure 2:
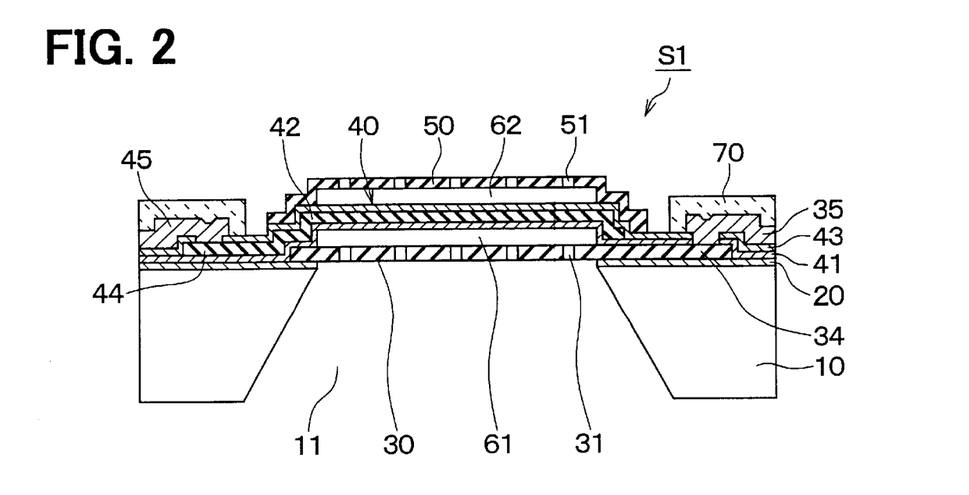
FIG. 2 is a cross sectional view taken along line II—II of FIG. 1.

As shown in FIG. 2, a first isolation layer 20, which is constructed of silicon nitride layer or the like, is formed on the first surface of the substrate 10. The first isolation layer 20 covers the first surface of the substrate 10. A lower electrode 30 is formed on the first isolation layer 20 to cover the opening portion 11.

In this embodiment, the lower electrode 30 is formed in a rectangular shape on the first surface shown as the referenced broken line in FIG. 1 and is supported by a peripheral portion of the opening portion 11. The lower electrode 30 is, for example, formed from poly-Si in which boron (impurity) is doped and diffused to obtain a high conductivity feature. The lower electrode 30 is electrically isolated from the substrate 10, by the first isolation layer 20.

A plurality of window portions (first etching windows) 31 is formed on a part of the lower electrode 30 positioned on the opening portion 11 to penetrate in a direction perpendicular to the lower electrode 30. The window portions 31 are arranged in a matrix-like, or mesh like, shape. Respective diameters of the window portions 31 can be, for example, at least approximately 0.5 μm.

As shown in FIG. 2, a second isolation layer 41, which is constructed of a silicon nitride layer or the like, is formed on the lower electrode 30 and the first isolation layer 20 formed at periphery of the lower electrode 30. The second isolation layer 41 is separated by a predetermined distance from the lower electrode 30 positioned on the opening portion 11.

An intermediate electrode 42 is formed on the second isolation layer 41 positioned above the opening portion 11. In this embodiment, the intermediate electrode 42 is rectangularly shaped on the first surface as shown by the referenced broken line in FIG. 1. The intermediate electrode 42 is, for example, formed poly-Si in which boron (impurity) is doped and diffused to obtain a high conductivity feature. The intermediate electrode 42 is electrically isolated from the lower electrode 30 by the second isolation layer 41.

A third isolation layer 43, which is constructed from silicon nitride layer or the like, is formed on the intermediate electrode 42 and the second isolation layer 41 formed at periphery of the intermediate electrode 42.

Accordingly, three-layer construction of the second isolation layer 41, the intermediate layer 42 and the third isolation layer 43 is formed on the lower electrode 30 positioned on the opening portion 11. The three-layer construction thus forms a movable electrode 40, or diaphragm, to which pressure can be applied.

An upper electrode 50 is formed on the third isolation layer 43 on the opening portion 11 (i.e., on the movable electrode 40) and is separated by a predetermined distance from the electrode 40. The upper electrode 50 is, for example, formed from poly-Si in which boron (impurity) is doped and diffused to obtain a high conductivity feature. The upper electrode 50 is electrically isolated from the intermediate electrode 40 by the third isolation layer 43.

A plurality of window portions (second etching windows) 51 is formed on a part of the upper electrode 50 positioned on the opening portion 11 to penetrate in a direction perpendicular to the lower electrode 30. The window portions 51 are arranged in a as matrix-like shape as the window portions 31 of the lower electrode 30. Respective diameters of the window portions 31 can be, for example, at least approximately 0.5 $\mu$m.

In this construction, a first cavity portion 61 is formed between the lower electrode 30 and the movable electrode 40, and a second cavity portion 62 is formed between the movable electrode 40 and the upper electrode 50.

The opening portion 11 formed in the substrate 10 penetrates from an outside of the second surface of the substrate 10 to the first surface thereof and communicates with the first cavity portion 61 via the first window portions 31 of the lower electrode 30. Further, the outside of the upper electrode 50 communicates with the second cavity portion 62 via the second window portions 51.

In the predetermined position of the first surface of the substrate 10, a lower electrode terminal 35 for electrically contacting the lower electrode 30, an intermediate electrode terminal 45 for electrically contacting the intermediate electrode 42 of the movable electrode 40 and an upper electrode terminal 55 for electrically contacting the upper electrode 50 are respectively formed on the third isolation layer 43. The lower electrode terminal 35 is electrically connected to the lower electrode 30 through an opening that is formed in the second and third isolation layers 41, 43 on an extending portion 34 from the lower electrode 30. The intermediate electrode terminal 45 is electrically connected to the intermediate electrode 42 through an opening that is formed in the third isolation layer 43 on an extending portion 44 from the intermediate electrode 42. The upper electrode terminal 55 is electrically connected to the upper electrode 50. The respective electrode terminals 35, 45, 55 are made of aluminum or the like.

As shown in FIGS. 1 and 2, a passivating layer 70, which is a silicon nitride layer or the like, is formed on the respective electrode terminals 35, 45, 55 and the periphery of the third isolation layer 43 of the upper electrode 50 to cover them.

A manufacturing process of the pressure sensor S1 of the present embodiment is described with reference to FIGS. 3–5, which show cross sectional views of a part of the pressure sensor S1 corresponding to FIG. 2.

Figure 3A:
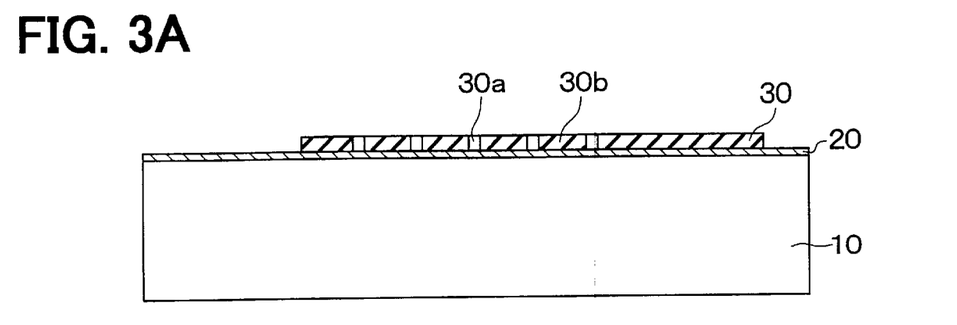
FIGS. 3A–3D are cross sectional views showing the production process of the electrical capacitance pressure sensor according to the first embodiment.

In the FIG. 3A, first, the lower electrode 30 is formed on the first surface of the substrate 10. Specifically, the first isolation layer 20 made of silicon nitride having a thickness of, for example, 100 $\mu$m is formed over the entire first surface of the substrate 10 by low-pressure CVD. The lower electrode 30 made of poly-Si with a thickness of, for example, 200–500 $\mu$m is then formed by low-pressure CVD.

Next, boron as an impurity is diffused into the lower electrode 31 with a high concentration except several parts of the lower electrode 31 in which window portions 31 are to be formed, thereby obtaining a high conductivity feature and durability against alkali etching liquid. Incidentally, reference number 30a is the region in which impurities do not diffuse, and reference number 30b is the region in which impurities diffuse.

Figure 3B:
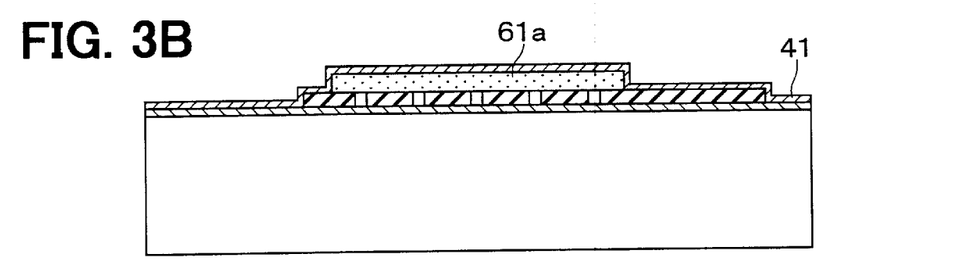

In FIG. 3B, a first sacrificial layer 61a is formed on a part of the lower electrode 30 where the movable electrode 40 is to be formed, i.e., where pressure is to be applied. For example, the first sacrificial layer 61a made of silicon oxide with a thickness of approximately 200 nm is formed on the part of the lower electrode 30 by plasma CVD.

Next, a movable electrode forming process that forms the movable electrode 40 on the first sacrificial layer 61a is performed. For example, the second isolation layer 41 made of silicon nitride with a thickness of approximately 200 nm is formed to cover the first sacrificial layer 61a by low-pressure CVD.

Figure 3C:
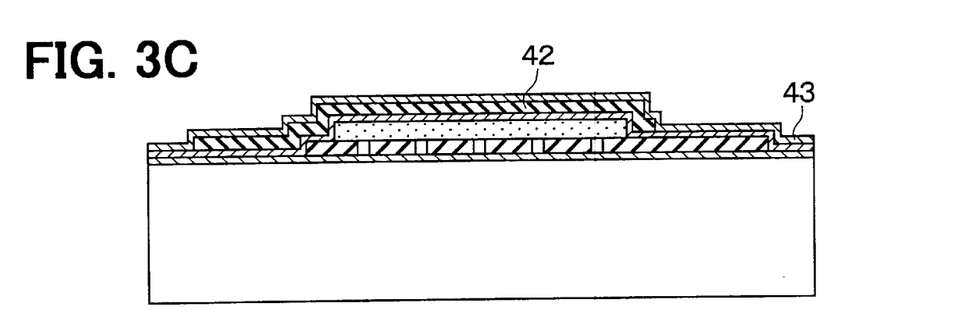

In FIG. 3C, the intermediate electrode 42 made of poly-Si with a thickness of, for example, approximately 200 nm is formed on the second isolation layer 41 to cover the first sacrificial layer 61a by low-pressure CVD. Further, boron as an impurity is diffused into the intermediate electrode 42 at a high concentration, thereby obtaining high conductivity. The third isolation layer 43 made of silicon nitride with a thickness of, for example, approximately 200 nm is formed to cover the intermediate electrode 43 by low-pressure CVD. In this manner, the movable electrode 40 is completed.

Figure 3D:
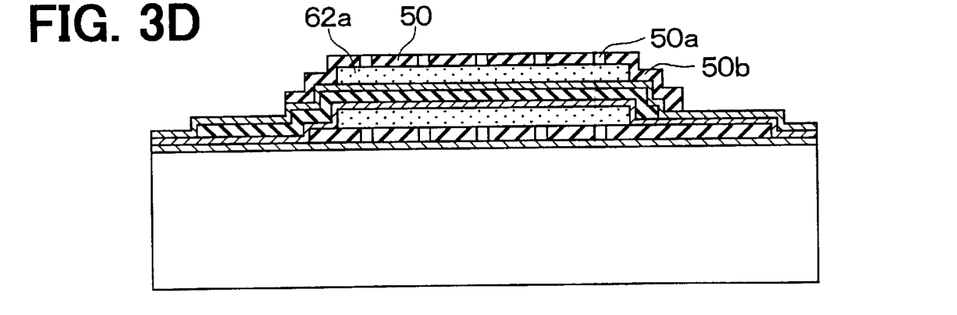

In FIG. 3D, a second sacrificial layer 62a is formed on the movable electrode 40 where pressure is to be applied. For example, the second sacrifice layer 62a made of silicon oxide with a thickness of approximately 200 nm is formed on the part of the movable electrode 40 by plasma CVD.

Next, an upper electrode forming process that forms the upper electrode 50 on the second sacrificial layer 62a is performed. For example, the upper electrode 50 made of poly-Si with a thickness of approximately 200 nm to 500 nm is formed to cover the second sacrificial layer 62a by low-pressure CVD.

Next, boron as an impurity is diffused into the upper electrode 50 at a high concentration except for several parts of the upper electrode 50 on which the window portions 51 are to be formed the window portions 51, thereby obtaining high conductivity feature and durability against alkali etching liquid. Incidentally, reference number 50a is the region in which impurities do not diffuse, and reference number 50b is the region in which impurities diffuse.

Figure 4A:
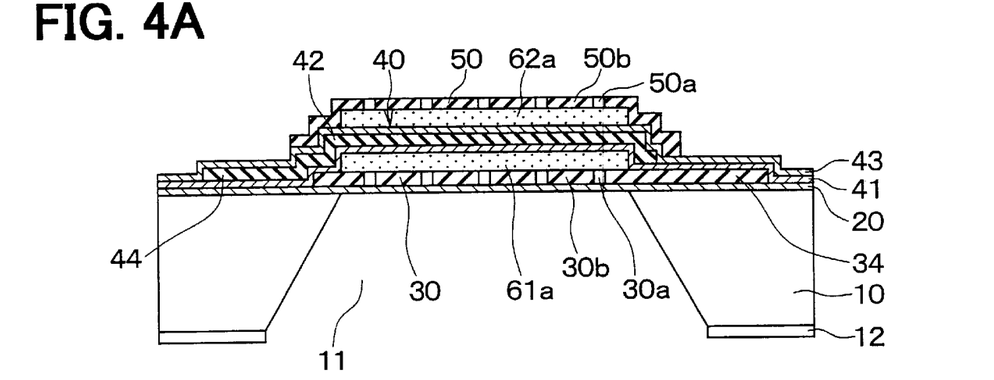
FIGS. 4A–4D are cross sectional views showing additional views of the production process of the electrical capacitance pressure sensor following FIG. 3D.

In FIG. 4A, the opening portion 11 is formed by etching the substrate 10 from the second surface. Specifically, a protection layer 12 made of silicon oxide is formed on the second surface by plasma CVD. A part of the protection layer 12 where corresponds to the opening portion 11 is then removed by etching, thereby forming an opening therein.

The substrate 10 with the protection layer 12 is immersed into an alkali etching liquid (e.g., potassium hydroxide solution, tetramethylammonium hydroxide or the like) to anisotropically etch the substrate 10 from the opening of the protection layer 12. In the etching, it is preferable to protect the side of the first surface of the substrate 10 from the etching liquid.

Figure 4B:
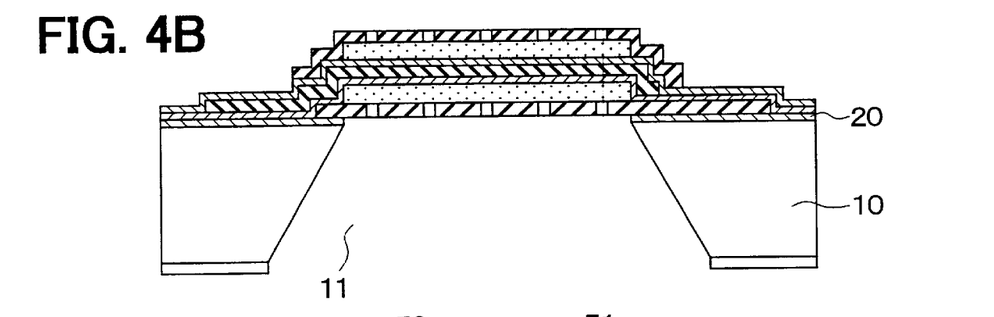

In FIG. 4B, the first isolation layer 20 exposed from the removed portion of the substrate 10 is removed by HF series solution, thereby forming the opening portion 11 that is used for a pressure introduction path.

Figure 4C:
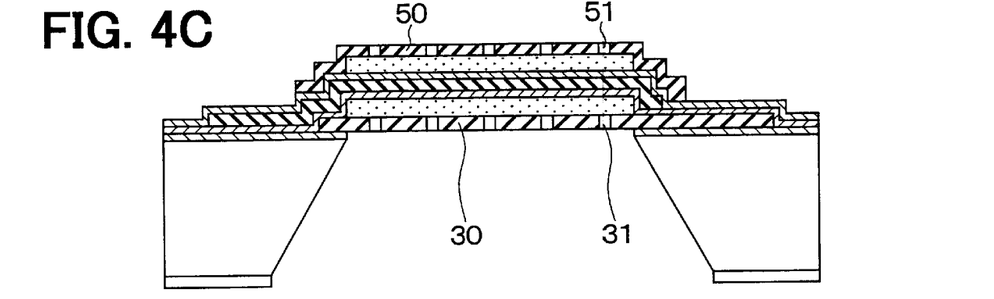

In FIG. 4C, the window portions 31 are formed in the lower electrode 30 to penetrate it and reach the first sacrificial layer 61a. Simultaneously, the window portions 51 are formed in the upper electrode 50 to penetrate it and reach the second sacrifice layer 62a.

For example, the substrate 10 after FIG. 4B is immersed into an alkali etching liquid. Therefore, the window portions 31, 51 are formed in the lower electrode 30 and the upper electrode 50, respectively.

Figure 4D:
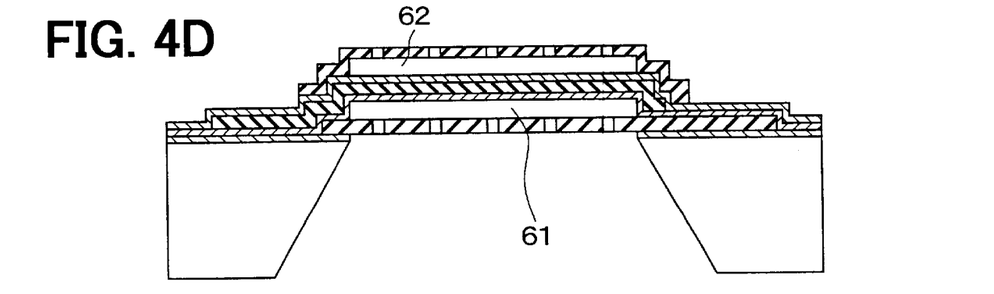

In FIG. 4D, the first and the second sacrificial layers 61a, 62a are removed by etching from the several window portions 31, 51 of the lower and the upper electrodes 30, 50, thereby forming the first and the second cavity portions 61, 62. For example, HF series solution is used for the etching of the first and the second sacrifice layers 61a, 62a.

Figure 5A:
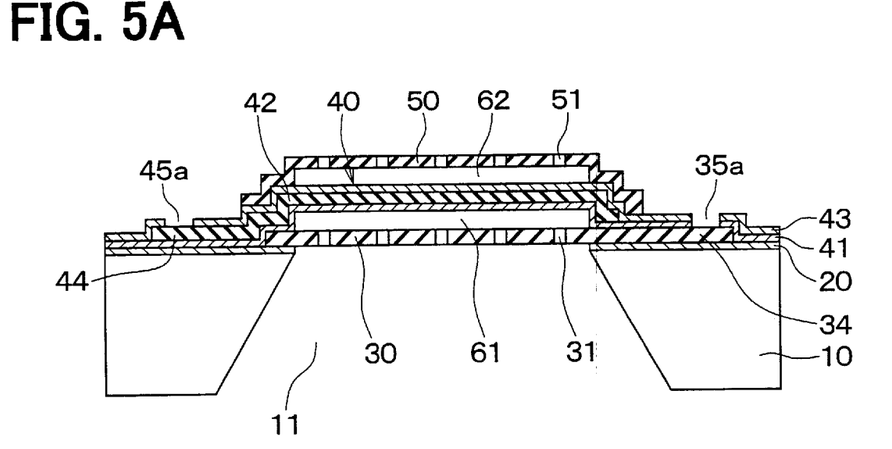
FIGS. 5A–5C are cross sectional views showing additional views of the production process of the electrical capacitance pressure sensor following FIG. 4D.

In FIG. 5A, the protection layer 12 is removed by etching. Further, a contact hole 45a for connecting to the intermediate electrode 40 and a contact hole 35a for connecting to the lower electrode 30 are formed. That is, a part of the second isolation layer 41 that is to be connected to the intermediate electrode 40 and a part of the second and the third isolation layers 41, 43 that is to be connected to the lower electrode 30 are removed.

Figure 5B:
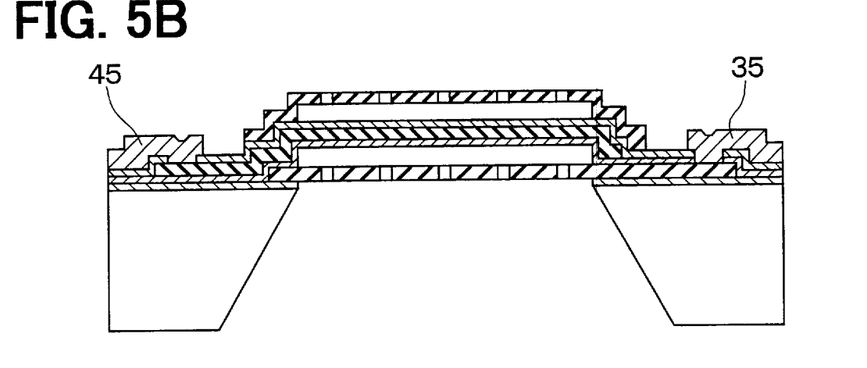

In FIG. 5B, an aluminum layer is formed and is patterned, thereby forming the lower electrode terminal 35, the intermediate electrode terminal 45 and the upper electrode terminal 55 (FIG. 1).

Figure 5C:
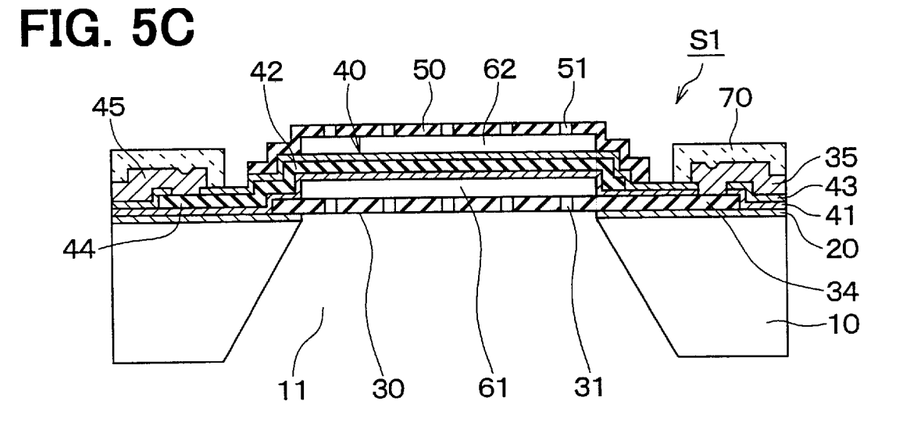

In FIG. 5C, the passivating layer 70 made of silicon nitride is formed by plasma CVD. In this manner, the pressure sensor S1 of the present embodiment is completed.

Figure 6A:
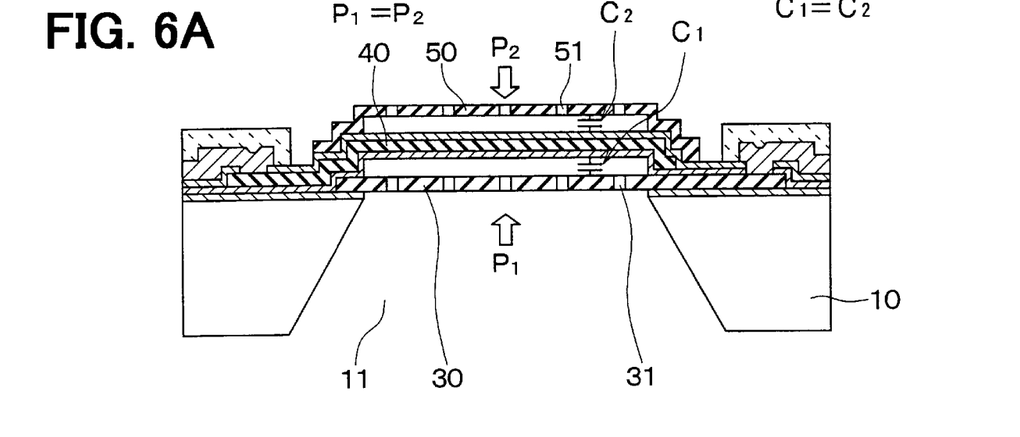
FIGS. 6A and 6B are cross sectional views showing operation of the electrical capacitance pressure sensor according to the first embodiment.
Figure 6B:
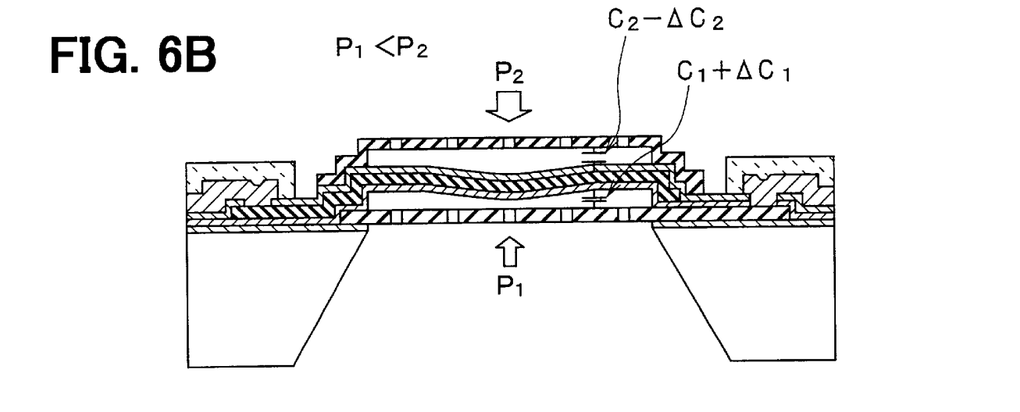

Next, an actuation of the pressure sensor S1 is described. As shown in FIGS. 6A and 6B, a first electrical capacitance C1 is formed between the movable electrode 40 and the lower electrode 30, and a second electrical capacitance C2 is formed between the movable electrode 40 and the upper electrode 50.

The pressure P1 on the side of the second surface of the substrate 10 is introduced into the first cavity portion 61 through the opening portion 11 and the window portion 31 of lower electrode 30. The pressure P2 on the side of the first surface of the substrate 10 is introduced into the second cavity portion 62 through the window portion 51 of upper electrode 50.

The movable electrode 40 deforms based on the pressure difference between the first and the second cavity portions 61, 62. Capacitance values of the first and the second electrical capacitances C1, C2 change with respect to the deformation of the movable electrode 40. Therefore, a pressure difference (P1−P2) between the pressure P1 and the pressure P2 can be detected based on the capacitance difference (C1−C2) between the first and the second electrical capacitances C1, C2. That is, the pressure sensor S1 of the present embodiment detects relative pressure based on the pressure difference (P1−P2).

Here, as shown in FIG. 6A, the first electrical capacitance value C1 is equal to the second electrical capacitance value C2 when the pressure P1 is equal to the pressure P2, and the pressure difference (P1−P2) is zero. Also, as shown in FIG. 6B, the first electrical capacitance value changes C1+ΔC1 and the second electrical capacitance value changes C2+ΔC2 when the pressure P1 is larger than the pressure P2.

Figure 7:
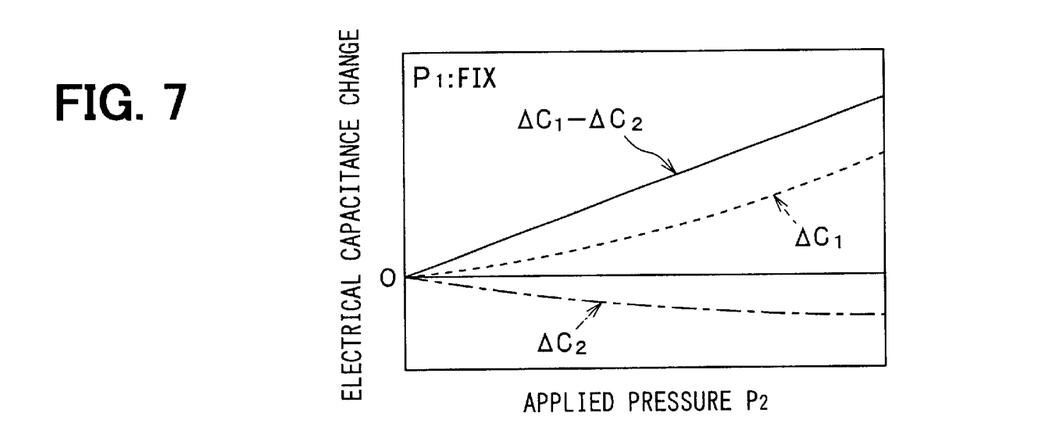
FIG. 7 is a graph showing a relationship between pressure applied to the electrical capacitance pressure sensor and the change in electrical capacitance according to the first embodiment.

For example, as indicated by the broken line in FIG. 7, the change of the first electrical capacitance ΔC1 increases in response to an increase of the pressure P2 because the gap between the lower and the intermediate electrodes 30, 40 decreases when the pressure P1 is fixed and the pressure P2 is increased. On the other hand, as indicated by the chain line in FIG. 7, the second electrical capacitance ΔC2 decreases in response to the increase of the pressure P2 because the gap between the intermediate and the upper electrodes 40, 50 increases.

In other words, characteristics of the first electrical capacitance to the pressure is negatively nonlinear and that of the second electrical capacitance to the pressure is positively nonlinear. Accordingly, the pressure sensor of the present embodiment outputs the capacitance difference between the first and second electrical capacitances. As a result, the value of the electrical capacitance in response to the pressure increases and, as expressed by the solid line in FIG. 7, output characteristics (ΔC1−ΔC2) have good linearity. Further, capacitance value changes of the first and second electrical capacitances based on the temperature change are balanced out.

According to the present pressure sensor S1, it is possible to obtain a degree of accuracy that is higher than that of conventional pressure sensors.

Further, in the present pressure sensor S1, the first and the second cavity portions 61, 62 are formed by etching the sacrificial layers 61a, 62a existing between the lower electrode 30 or the upper electrode 50 and the intermediate electrode 40. Also, to communicate the first and the second cavity portions 61, 62 to the outside thereof through the first and the second window portions 31, 51, the lower and the upper electrodes 30, 50 are made of a material that can withstand the etching liquid of the first and the second sacrifice layers 61a, 62a (alkali etching liquid).

Therefore, it is possible to etch the first and the second sacrifice layers 61a, 62a through the several window portions 31, 51 as paths of etching liquid without etching the lower and the upper electrodes 30, 50.

Accordingly, because it is unnecessary to remove a part of the lower and the upper electrodes 30, 50 by the etching liquid, a decrease of an electrode area is minimized, as it is possible to provide an electrical capacitance pressure sensor that is capable of controlling a decrease in sensitivity thereof. Also, an arrangement and a shape thereof considering a removal area in not limited because the lower and the upper electrodes 30, 50 is not removed.

(Second Embodiment)

Figure 8:
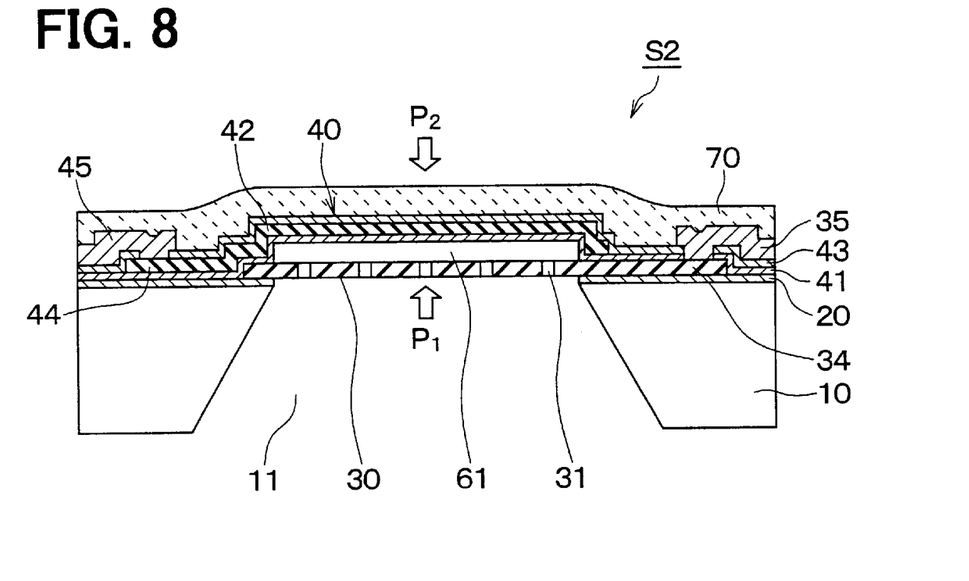
FIG. 8 is a cross sectional view showing an electrical capacitance pressure sensor of a second embodiment.

In the second embodiment shown in FIG. 8, an electrical capacitance pressure sensor (pressure sensor) S2 has a different construction from the first embodiment. As shown in FIG. 8, in this embodiment, the pressure sensor S2 is modified with respect to the pressure sensor S1 in the first embodiment.

In the pressure sensor S2, the upper electrode 50 and the upper electrode terminal 55 are formed in the first embodiment, and a passivating layer 70 is formed to cover an entire surface of the substrate 10 with respective elements.

The pressure sensor S2 includes a first isolation layer 20, a lower electrode 30 with several window portions (etching windows) 31, a cavity portion 61, a second isolation layer 41, an intermediate electrode 42, a third isolation layer 43, a lower electrode terminal 35, a movable electrode terminal 45 and a passivating layer 70.

The pressure sensor S2 is generally manufactured using as the same processes as the first embodiment. The manufacturing of the pressure sensor S2 is described with reference to FIGS. 3 to 5.

As in the first embodiment, a lower electrode forming process (FIG. 3A) to form the lower electrode 30 on a first surface of a substrate 10, a sacrificial layer forming process (FIG. 3B) to form a sacrificial layer 61a on the lower electrode 30, and a movable electrode forming process (FIG. 3C) to form the movable electrode 40 are performed.

Subsequently, an opening portion forming process (FIGS. 4A, 4B) to form an opening portion 11 in the substrate 10, and a window portions forming process (FIG. 4C) to form several window portions 31 that penetrate the lower electrode 30 and reach the sacrifice layer 61a are preformed. That is, the upper electrode forming process to form the upper electrode 50 in the first embodiment is not performed.

A cavity portion forming process (FIG. 4D) to form the cavity portion 61 is performed by etching the sacrificial layer 61a by pouring etching liquid through the opening portion 11 and the window portions 31. A contact hole forming process (FIG. 5A) to form contact holes 35a, 55a is then performed.

An electrode terminal forming process (FIG. 5B) to form the lower electrode terminal 35 and the movable electrode terminal 45 by etching an aluminum layer is performed. Further, a passivating layer forming process to form the passivating layer 70 is performed. Therefore, the electrical capacitance pressure sensor S2 shown in FIG. 8 is completed.

In the pressure sensor S2, the movable electrode 40 is disposed so that it is separated by a predetermined distance from the lower electrode 30 and acts as a diaphragm. An electrical capacitance is formed between the lower electrode 30 and the movable electrode 40.

A pressure P1 is introduced into the cavity portion 61 through the opening portion 11 in the substrate 10 and the window portions 31, and a pressure P2 is applied to the side of the first surface of the substrate 10. The movable electrode 40 deforms based on the pressure difference between the both pressures P1, P2. Also, a capacitance value of the electrical capacitance changes with respect to the deformation of the movable electrode 40. Therefore, a pressure difference (P1–P2) between the pressure P1 and the pressure P2 can be detected based on a capacitance value change of the electrical capacitance. That is, the pressure sensor S2 of the present embodiment detects relative pressure based on the pressure difference (P1–P2).

According to the pressure sensor S2 of the second embodiment, the cavity portion 61 is formed by etching the sacrificial layer 61a existing between the lower electrode 30 and the movable electrode 40. Also, to communicate the cavity portion 61 to the outside thereof through the window portions 31 formed in the lower electrode 30, the lower electrode 30 is made of a material that can withstand the etching liquid of the sacrifice layer 61a (alkali etching liquid).

Therefore, it is possible to etch the sacrifice layer 61a through the several window portions 31 acting as etching liquid paths without etching the lower electrode 30.

Accordingly, because it is unnecessary to remove a part of the electrode 30 with the etching liquid, a decrease in electrode area is minimized, and it is possible to provide an electrical capacitance pressure sensor that is capable of controlling the decrease insensitivity thereof. Also, an arrangement and a shape thereof considering a removal area is not limited because the lower electrode 30 is not removed.

(Third Embodiment)

Figure 9:
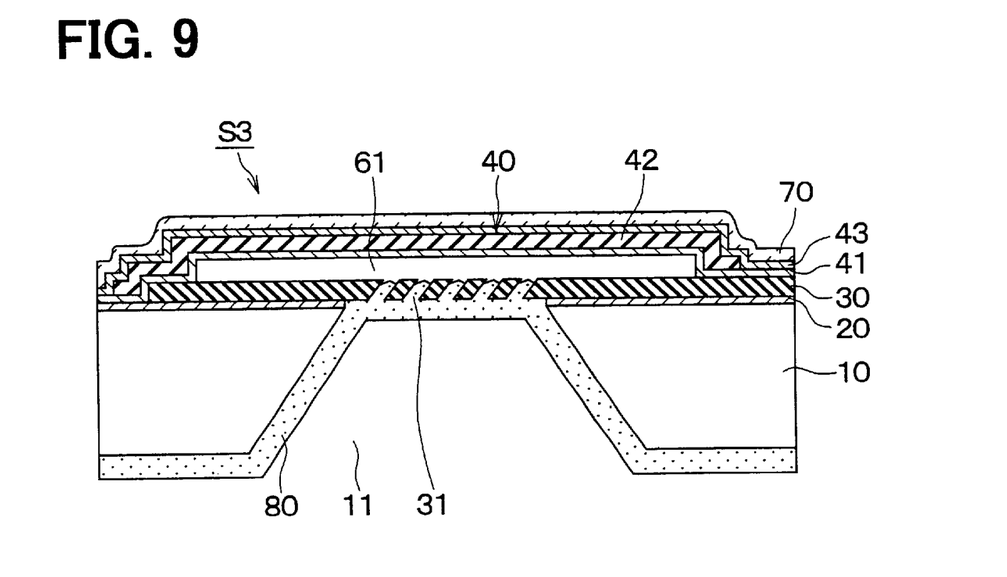
FIG. 9 is a cross sectional view showing an electrical capacitance pressure sensor of a third embodiment.

In the third embodiment shown in FIG. 9, an electrical capacitance pressure sensor (pressure sensor) S3 has a different construction from the second embodiment. As shown in FIG. 9, in this embodiment, the pressure sensor S3 is modified with respect to the pressure sensor S2 in the second embodiment.

The pressure sensor S3 includes a cap member 80 for covering several window portions 31 of a lower electrode 30 from a side of an opening portion 11 of a substrate 10. For example, the cover member 80 is made of silicon nitride. The several window portions 31 are formed to penetrate in a diagonal direction with respect to a perpendicular direction of the lower electrode 30.

The other elements are the same as the pressure sensor S2 of the second embodiment. That is, the pressure sensor S3 includes the substrate 10 with the opening portion 11 on which a first isolation layer 20, a lower electrode 30, a cavity portion 61, a second isolation layer 41, an intermediate electrode 42, a third isolation layer 43, lower and a movable electrode terminals (not shown), and a passivating layer 70.

In the pressure sensor S3, the cavity portion 61 is sealed in an airtight manner by the cover member 80 to form a predetermined pressure (e.g., vacuum pressure) and acts as a pressure reference chamber.

A manufacturing process of the pressure sensor S3 of the present embodiment is described. The pressure sensor S3 is generally manufactured using the same processes as the second embodiment.

As in the second embodiment, a lower electrode forming process (FIG. 3A) to form the lower electrode 30 on a first surface of a substrate 10, a sacrifice layer forming process (FIG. 3B) to form a sacrifice layer 61a on the lower electrode 30, and a movable electrode forming process (FIG. 3C) to form the movable electrode 40 are performed.

However, in the lower electrode forming process, an oblique ion implantation with boron is conducted to obliquely implant the ions into the lower electrode 30 except in regions in which the several window portions 31 are to be formed.

Subsequently, an opening portion forming process (FIGS. 4A, 4B) to form the opening portion 11 in the substrate 10, are a window portions forming process (FIG. 4C) to form the several window portions 31 that penetrate the lower electrode 30 and reach the sacrifice layer 61a are performed. Also, a cavity portion forming process (FIG. 4D) to form the cavity portion 61 is performed by etching the sacrifice layer 61a by pouring etching liquid through the opening portion 11 and the window portions 31. The condition through the above-mentioned processes is shown in FIG. 10A.

Figure 10A:
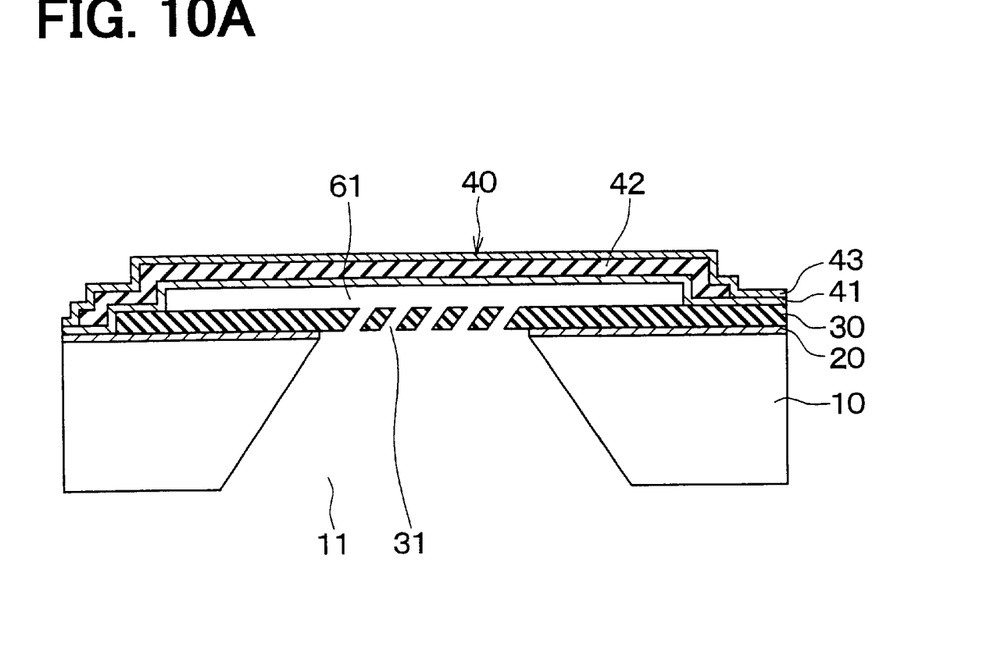
FIGS. 10A and 10B are cross sectional views showing the production process of the electrical capacitance pressure sensor according to the third embodiment.

Next, as shown in FIG. 10A, the cover member 80 is formed to cover the several window portions 31 of the lower electrode 30 from the side of the opening portion 11 of the substrate 10, thereby sealing the cavity portion 61 in an airtight manner. Specifically, a silicon nitride layer is formed by plasma CVD or the like in the vacuum pressure.

Figure 10B:
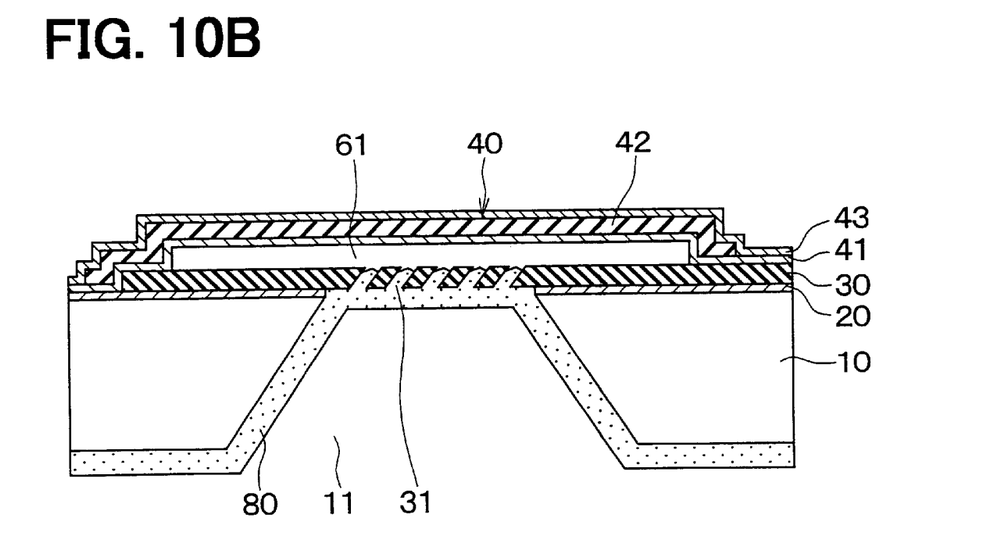

A contact hole forming process (FIG. 5A) to form contact holes 35a, 55a is then performed. An electrode terminal forming process (FIG. 5B) to form the lower electrode terminal 35 and the movable electrode terminal 45 by etching an alminium layer is performed. Further, a passivating layer forming process to form the passivating layer (not shown) is performed. Therefore, as shown in FIG. 10B, the electrical capacitance pressure sensor S2 is completed.

In the pressure sensor S3, a movable electrode 40 is disposed a predetermined distance from the lower electrode 30 and acts as a diaphragm. An electrical capacitance is formed between the lower electrode 30 and the movable electrode 40. The cavity portion 61 acts as the reference pressure chamber because the cover portion 80 seals the window portions 31 to separate the cavity portion 61 from an outside thereof.

An outside pressure of the cavity portion 61 is applied to the movable electrode 40 via the passivating layer 70. Accordingly, the movable electrode 40 deforms based on the pressure difference between the outside and inside pressures of the cavity portion 61. Also, a capacitance value of the electrical capacitance changes with respect to the deformation of the movable electrode 40. Therefore, the outside pressure can be detected based on a capacitance value change of the electrical capacitance. That is, the pressure sensor S3 of the present embodiment detects absolute pressure.

According to the pressure sensor S3 of the third embodiment, the cavity portion 61 is formed by etching the sacrificial layer 61a existing between the lower electrode 30 and the movable electrode 40. Also, to communicate the cavity portion 61 to the outside thereof through the window portions 31 formed in the lower electrode 30, the lower electrode 30 is made of a material capable of withstanding the etching liquid of the sacrificial layer 61a (alkali etching liquid).

Therefore, it is possible to etch the sacrificial layer 61a through the several window portions 31 as paths of etching liquid without etching the lower electrode 30.

Accordingly, because it is unnecessary to remove a part of the electrode 30 by the etching liquid, a decrease in an electrode area is minimizes, and it is possible to provide an electrical capacitance pressure sensor that is capable of minimizing a decrease insensitivity thereof. Also, an arrangement and a shape thereof considering a removal area is not limited because the lower electrode 30 is not removed.

In the prior electrical capacitance pressure sensor disclosed by JP-A-214035, window portion through which a sacrificial layer is etched to form a cavity portion is formed in a movable electrode, and thereafter a reference pressure chamber is formed by sealing the window portion. That is, a seal member is formed on the movable electrode that is to be formed into a diaphragm. Accordingly, it is difficult to obtain uniform diaphragm features.

However, according to the pressure sensor S3 of the third embodiment, the window portions 31 are not formed in the movable electrode 40 that is to be formed as the diaphragm. Rather, they are formed in the lower electrode 30. Therefore, it is possible to obtain uniform diaphragm features.

In the manufacturing process of the pressure sensor S3, the window portions 31 are formed to penetrate in a diagonal direction with respect to the perpendicular direction of the lower electrode 30. Accordingly, because the cover member 80 cannot proceed into the cavity portion 61, a reference pressure chamber having a desired shape is obtained.

Incidentally, the window portions 31 may alternatively be formed in a direction perpendicular to the lower electrode 30. However, the cover member 80 may proceed into the cavity portion 61. Therefore, it is preferable to form the window portion 31 in the diagonal direction with respect to the perpendicular direction of the lower electrode 30.

However, if the cover member 80 is formed by plasma CVD or the like and a growth direction thereof is in a diagonal direction with respect to the perpendicular direction of the lower electrode 30, the cover member 80 certainly cannot proceed into the cavity portion 61.

(Fourth Embodiment)

Figure 11:
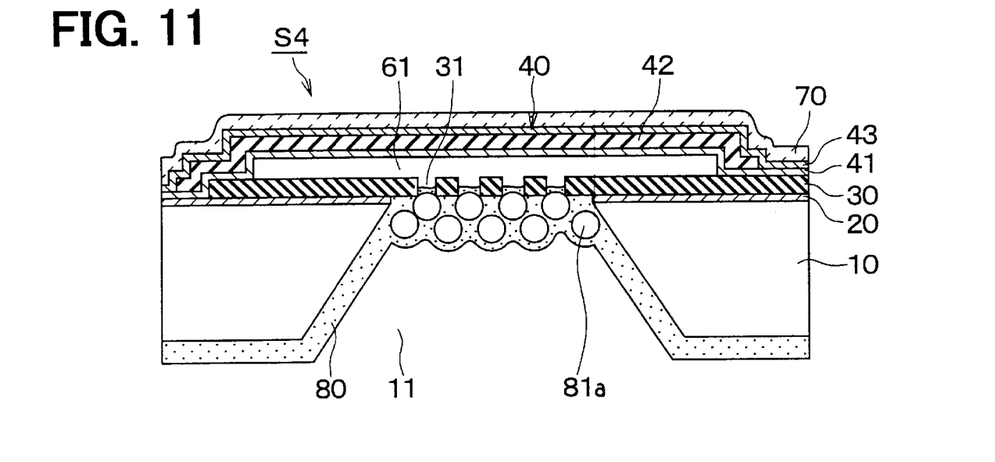
FIG. 11 is a cross sectional view showing an electrical capacitance pressure sensor of a fourth embodiment.

In the fourth embodiment shown in FIG. 11, an electrical capacitance pressure sensor (pressure sensor) S4 has a different construction from the third embodiment. As shown in FIG. 11, the pressure sensor S4 includes ball members (large diameter members) 81a and a cover member 80. A diameter of each ball member 81a is larger than that of respective of window portions 31 formed in the lower electrode 30. The ball members 81a fill in the window portions 31 with the cover member 80.

According to the fourth embodiment, the cover member 80 cannot proceed into the cavity portion 61 because the ball member 81a having a diameter larger than the window portions 31 covers the window portions 31. Therefore, it is possible to obtain the same advantages as in the third embodiment.

Incidentally, the pressure sensor S4 of the fourth embodiment can be manufactured by the same process as the third embodiment. In this case, the ball members 81a are disposed on the lower electrode 30 to cover the several window portions 31 before the cover member 80 is formed.

(Fifth Embodiment)

Figure 12:
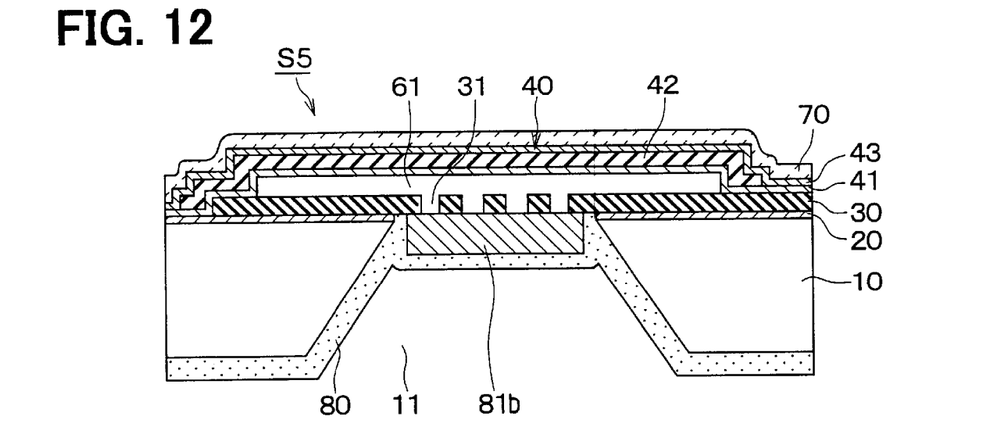
FIG. 12 is a cross sectional view showing an electrical capacitance pressure sensor of a fifth embodiment.

In the fifth embodiment shown in FIG. 12, an electrical capacitance pressure sensor (pressure sensor) S5 has a different construction from the fourth embodiment. As shown in FIG. 12, the pressure sensor S5 includes a circular cylinder member (large diameter member) 81b and a cover member 80. A diameter of the circular cylinder member 81b is larger than that of a region including several window portions 31 formed in the lower electrode 30. The circular cylinder member 81b fills in the window portions 31 with the cover member 80.

According to the fifth embodiment, the cover member 80 cannot penetrate into the cavity portion 61 because the circular cylinder member 81b covers the window portions 31.

Incidentally, the pressure sensor S4 of the fifth embodiment can be manufactured by the same process as the third embodiment. In this case, the circular cylinder member 81b is disposed on the lower electrode 30 to cover the several window portions 31 before the cover member 80 is formed. Therefore, it is possible to obtain the same advantages as the fourth embodiment.

(Modification)

In the first to fifth embodiment, respective pressure sensors S1–S5 are formed using the substrate 10, the lower electrode 30 with the several window portions 31, the movable electrode 40, the cavity portion 61. However, a different construction may alternatively be used.

Figure 13:
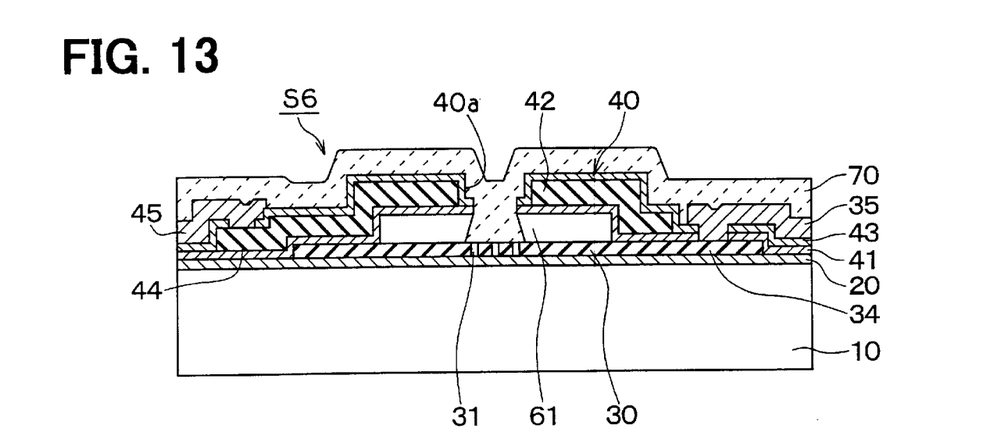
FIG. 13 is a cross sectional view showing an electrical capacitance pressure sensor of a sixth embodiment.

For example, as shown in FIG. 13, an electrical capacitance pressure sensor (pressure sensor) S6 includes a substrate 10, a lower electrode 30 formed on a side of the substrate 10, a movable electrode 40 formed on the lower electrode 10 through a cavity portion 61, and a passivating layer 70 formed on the movable electrode 40. Several window portions 31 are formed in the lower electrode 30 to penetrate the cavity portion 61 from a side of the substrate 10 of the lower electrode 30.

An opening 40a is formed in the movable electrode 40 to penetrate in a direction perpendicular thereof with respect to the window portions 31 of the lower electrode 30. Further, the passivating layer 70 proceeds into the opening 40a to fill a part of the cavity portion 61 and to adhere to the part of the lower electrode 31 where the window portions 31 are formed.

In the pressure sensor S5, a total adhesion area between the passivating layer 70 and the lower electrode 30 can be lengthened because the passivating layer 70 proceeds into the window portions 31. Accordingly, the cavity portion 61 is sealed in an airtight manner and acts as a reference pressure chamber having a predetermined pressure.

That is, the pressure sensor S5 is the same construction as the prior pressure sensor disclosed in JP-A-2000-214035 with the window portions 31 of the lower electrode 30. It is, however, possible to improve the adhesiveness because the total adhesion area between the passivating layer 70 and the lower electrode 30 of the present pressure sensor S1 is larger than that of the prior pressure sensor. Therefore, the pressure sensor S1 has more reliable sealing construction.

Figure 14:
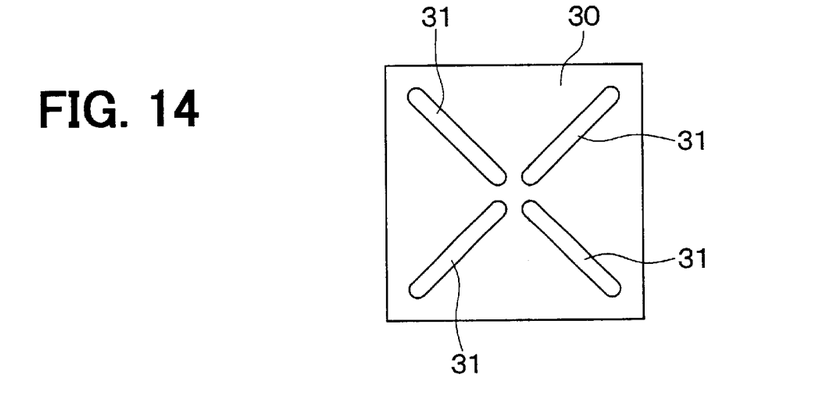
FIG. 14 is a cross sectional view showing a modified electrical capacitance pressure sensor of the present invention.

In the above-mentioned embodiment, an arrangement of the window portions 31, 51 of the lower and the upper electrodes 30, 50 can be adopted to the other arrangement. For example, as shown in FIG. 14, a slit shaped arrangement can alternatively be adopted. Further, an opening can alternatively be adopted instead of the several window portions 31, 51. For example, across-shaped opening, a scroll shaped opening or a meandering shape opening can be alternatively adopted.

In the fourth embodiment, several balls having different diameters can be adopted as the ball member 81 if the respective diameter is larger than the window portion 61.

While the above description is of the preferred embodiments of the present invention, it should be appreciated that the invention may be modified, altered, or varied without deviating from the scope and fair meaning of the following claims.

What is claimed is:

1. An electrical capacitance pressure sensor comprising:
   a substrate having a first and a second surface;
   a lower electrode formed on the first surface of the substrate;
   a movable electrode formed on the lower electrode and separated by a predetermined distance from the lower electrode to form a diaphragm;
   a cavity portion formed between the lower electrode and the movable electrode to form an electrical capacitance that is to be changed when the movable electrode deforms based on an applied pressure thereon; and
   a cover member formed on the lower electrode;
   wherein the substrate has an opening portion that penetrates the substrate from the first surface to the second surface,
   the lower electrode has at least one window portion that penetrates the lower electrode from a side of the substrate to a side of the cavity portion and communicates the cavity portion to the opening portion of the substrate;
   the cover member is formed on a side of the opening portion of the substrate and covers the at least one window portion to separate the cavity portion from an outside thereof and to form a reference pressure chamber in the cavity portion.

2. An electrical capacitance pressure sensor according to claim 1, wherein the lower electrode is made of poly-Si.

3. An electrical capacitance pressure sensor according to claim 1, wherein the at least one window portion is formed in a diagonal direction with respect to a perpendicular direction of the lower electrode.

4. An electrical capacitance pressure sensor according to claim 1 further comprising:
   at least one large diameter member having a diameter larger than that of the window portion and for covering the window portion.

5. An electrical capacitance pressure sensor according to claim 4, wherein the at least one large diameter member is a ball member or a circular cylinder member.

6. An electrical capacitance pressure sensor according to claim 4, wherein the at least one window portion is formed in a perpendicular direction of the lower electrode.

7. An electrical capacitance pressure sensor according to claim 4, wherein the lower electrode is made of poly-Si.

8. An electrical capacitance pressure sensor comprising:
   a substrate having first and second surfaces;
   a lower electrode formed on the first surface of the substrate;
   a movable electrode formed on the lower electrode and separated by a predetermined distance from the lower electrode, for forming a diaphragm;
   an upper electrode formed on the movable electrode and separated by a predetermined distance from the movable electrode,
   a first cavity portion formed between the lower electrode and the movable electrode to form an electrical capacitance that is to be changed to a first capacitance value when the movable electrode deforms based on a pressure difference between both sides thereof; and
   a second cavity portion formed between the upper electrode and the movable electrode to form an electrical capacitance that is to be changed to a second capacitance value thereof when the movable electrode deforms based on the pressure difference between both sides thereof;
   wherein the substrate has an opening portion that penetrates the substrate from the first surface to the second surface thereof,
   the lower electrode has at least one first window portion that penetrates the lower electrode from the side of the substrate to the side of the first cavity portion and communicates the cavity portion to the opening portion of the substrate, and
   the upper electrode has at least one second window portion that penetrates the upper electrode from the side of the cavity portion to the outside thereof to communicate the cavity portion to an outside environment.

9. An electrical capacitance pressure sensor according to claim 8, wherein the lower electrode and the upper electrode are made of poly-Si.

10. A method for manufacturing an electrical capacitance pressure sensor comprising:
    preparing a substrate having first and second surfaces;
    forming a lower electrode on the first surface of the substrate;
    forming a sacrificial layer on the lower electrode;
    forming a movable electrode on the sacrifice layer;
    etching the substrate from the second surface to form an opening portion;
    forming at least one window portion to penetrate a part of the lower electrode that is exposed from the opening portion of the substrate;
    etching the sacrificial layer to form a cavity portion and a diaphragm by the movable electrode through the opening portion of the substrate and the at least one window portion of the lower electrode; and
    forming a cover member on the lower electrode on a side of the opening portion of the substrate to cover the at least one window portion and to form a reference pressure chamber in the cavity portion.

11. A method for manufacturing an electrical capacitance pressure sensor according to claim 10,
    wherein the forming the lower electrode includes forming a poly-Si layer on the first surface of the substrate, and
    the forming at least one window portion includes implanting ions into the poly-Si layer except a region where the at least one window portion is to be formed, and etching the region of the poly-Si layer to form the at least one window portion.

12. A method for manufacturing an electrical capacitance pressure sensor according to claim 11, wherein the etching the region of the poly-Si layer is conducted after the etching the substrate to form the opening portion by etching the region of the poly-Si layer through the opening portion.

13. A method for manufacturing an electrical capacitance pressure sensor according to claim 12, wherein forming the at least one window portion includes forming the at least one window portion in a diagonal direction with respect to a perpendicular direction of the lower electrode.

14. A method for manufacturing an electrical capacitance pressure sensor according to claim 10 further comprising, covering the at least one window portion with at least one large diameter member having a diameter larger than that of the window portion, wherein the forming a cover member includes covering the at least one window portion with the at least one large diameter member.

15. A method for manufacturing an electrical capacitance pressure sensor according to claim 14, wherein the covering the at least one window portion includes covering the at least one window portion with at least one ball member or circular cylinder member.

16. A method for manufacturing an electrical capacitance pressure sensor according to claim 14, wherein forming the at least one window portion includes forming the at least one window portion in a perpendicular direction of the lower electrode.

17. A method for manufacturing an electrical capacitance pressure sensor according to claim 16, wherein the forming the lower electrode includes forming a poly-Si layer on the first surface of the substrate, and the forming at least one window portion includes implanting ions into the poly-Si layer except for a region where the at least one window portion is to be formed, and etching the region of the poly-Si layer to form the at least one window portion.

18. A method for manufacturing an electrical capacitance pressure sensor according to claim 17, wherein the etching the region of the poly-Si layer is conducted after the etching the substrate to form the opening portion by etching the region of the poly-Si layer through the opening portion.

19. A method for manufacturing an electrical capacitance pressure sensor comprising:

preparing a substrate having a first and a second surface;

forming a lower electrode on the first surface of the substrate;

forming a first sacrificial layer on the lower electrode;

forming a movable electrode on the first sacrificial layer;

forming a second sacrifice layer on the movable electrode;

forming an upper electrode on the second sacrificial layer;

etching the substrate from the second surface to form an opening portion;

forming at least one first window portion to penetrate a part of the lower electrode that is exposed from the opening portion of the substrate;

forming at least one second window portion to penetrate a part of the upper electrode; and etching the first and second sacrificial layers to form a first cavity portion, a second cavity portion and a diaphragm by the movable electrode through the opening portion of the substrate, the at least one first window portion of the lower electrode and the at least one first window portion of the upper electrode.

20. A method for manufacturing an electrical capacitance pressure sensor according to claim 19, wherein the forming the lower electrode includes forming first poly-Si layer on the first surface of the substrate, the forming the upper electrode includes forming second poly-Si layer on the second sacrifice layer, the forming at least one first window portion includes implanting ions into the first poly-Si layer except a region where the at least one first window portion is to be formed, and etching the region of the first poly-Si layer to form the at least one first window portion, and the forming at least one second window portion includes implanting ions into the second poly-Si layer except a region where the at least one second window portion is to be formed, and etching the region of the second poly-Si layer to form the at least one second window portion.

21. A method for manufacturing an electrical capacitance pressure sensor according to claim 20, wherein the etching the region of the first poly-Si layer is conducted after the etching the substrate to form the opening portion by etching the region of the first poly-Si layer through the opening portion.

22. A method for manufacturing an electrical capacitance pressure sensor according to claim 21, wherein the etching the region of the first poly-Si layer and the etching the region of the second poly-Si layer is simultaneously conducted.

* * * * *